(12) United States Patent
Lin et al.

(10) Patent No.: US 10,623,945 B2
(45) Date of Patent: Apr. 14, 2020

(54) METHOD, APPARATUS, AND SYSTEM FOR MANAGING IMSI STATUS OF TERMINAL DEVICE

(71) Applicant: HUAWEI TECHNOLOGIES CO., LTD., Shenzhen, Guangdong (CN)

(72) Inventors: Bo Lin, Beijing (CN); Zhenglei Huang, Beijing (CN); Xin Xiong, Beijing (CN); Wanqiang Zhang, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/239,426

(22) Filed: Jan. 3, 2019

(65) Prior Publication Data
US 2019/0141518 A1 May 9, 2019

Related U.S. Application Data

(63) Continuation of application No. PCT/CN2016/088296, filed on Jul. 4, 2016.

(51) Int. Cl.
*H04W 8/18* (2009.01)
*H04W 8/06* (2009.01)
(Continued)

(52) U.S. Cl.
CPC ........... *H04W 8/205* (2013.01); *H04W 4/025* (2013.01); *H04W 8/04* (2013.01); *H04W 8/24* (2013.01);
(Continued)

(58) Field of Classification Search
CPC ......... H04W 8/18; H04W 8/06; H04W 48/16; H04W 60/06; H04W 16/04; H04W 4/50;
(Continued)

(56) References Cited

U.S. PATENT DOCUMENTS 5,887,253 A * 3/1999 O'Neil ................. H04W 8/265
455/410
6,366,777 B1 4/2002 Uusitalo
(Continued)

FOREIGN PATENT DOCUMENTS

CN 1124065 C 10/2003
CN 1808996 A 7/2006
(Continued)

OTHER PUBLICATIONS

3GPP TS 23.401 V14.0.0 (Jun. 2016),3rd Generation Partnership Project;Technical Specification Group Services and System Aspects;General Packet Radio Service (GPRS) enhancements for Evolved Universal Terrestrial Radio Access Network (E-UTRAN) access(Release 14),total 374 pages.

*Primary Examiner* — William D Cumming
(74) *Attorney, Agent, or Firm* — Womble Bond Dickinson (US) LLP

(57) ABSTRACT

Embodiments of this application provide a method, an apparatus, and a system for managing an international mobile subscriber identity (IMSI) status of a terminal device. An IMSI of a second terminal device is activated or deactivated through interaction between a first terminal device and a core network node, so that the second terminal device does not participate in activating or deactivating the IMSI of the second terminal device. Therefore, power consumption of the second terminal device can be reduced, and a requirement of an Internet of Things application scenario can be met.

20 Claims, 5 Drawing Sheets

(51) Int. Cl.
  *H04W 16/04* (2009.01)
  *H04W 8/04* (2009.01)
  *H04W 52/02* (2009.01)
  *H04W 8/20* (2009.01)
  *H04W 8/24* (2009.01)
  *H04W 4/02* (2018.01)
  *H04W 60/00* (2009.01)

(52) U.S. Cl.
  CPC ........... *H04W 8/245* (2013.01); *H04W 60/00* (2013.01); *Y02D 70/00* (2018.01)

(58) Field of Classification Search
  CPC ....... H04W 8/265; H04W 52/02; H04W 8/02; H04W 12/06; H04W 76/11; H04W 76/32; H04W 8/04; H04W 52/0209; H04M 15/715
  USPC ...... 455/552.1, 410, 412.1, 413, 411, 432.1; 370/328
  See application file for complete search history.

(56) References Cited

U.S. PATENT DOCUMENTS

| | | | | |
|---|---|---|---|---|
| 8,417,221 | B2 * | 4/2013 | Shaw | H04L 51/38 455/412.1 |
| 8,452,327 | B2 * | 5/2013 | Liu | H04W 8/18 455/552.1 |
| 8,520,593 | B2 * | 8/2013 | Guo | H04W 60/06 370/328 |
| 8,725,119 | B2 * | 5/2014 | Shaw | H04L 51/38 455/413 |
| 8,838,168 | B2 * | 9/2014 | Liu | H04W 8/18 455/552.1 |
| 8,838,814 | B2 * | 9/2014 | Wang | H04L 41/048 709/228 |
| 9,060,358 | B2 * | 6/2015 | Liu | H04W 8/18 |
| 9,241,261 | B2 * | 1/2016 | He | H04L 63/1441 |
| 9,369,860 | B2 * | 6/2016 | Liu | H04W 8/18 |
| 9,474,038 | B2 * | 10/2016 | Guo | H04W 76/32 |
| 9,497,625 | B2 * | 11/2016 | He | H04L 63/1441 |
| 9,538,373 | B2 * | 1/2017 | He | H04L 63/1441 |
| 9,571,664 | B2 * | 2/2017 | Mathison | H04M 15/715 |
| 9,572,027 | B2 * | 2/2017 | He | H04L 63/205 |
| 9,699,646 | B2 * | 7/2017 | Poon | H04W 12/06 |
| 9,754,290 | B2 * | 9/2017 | Shaw | H04L 51/38 |
| 9,854,587 | B2 * | 12/2017 | Guo | H04W 8/06 |
| 9,955,332 | B2 * | 4/2018 | Raleigh | H04W 4/24 |
| 10,009,934 | B2 * | 6/2018 | Liu | H04W 8/18 |
| 10,015,669 | B2 * | 7/2018 | He | H04W 8/02 |
| 10,021,640 | B2 * | 7/2018 | Lin | H04W 52/0209 |
| 10,200,852 | B1 * | 2/2019 | Datar | H04W 8/06 |
| 10,244,471 | B2 * | 3/2019 | Lin | H04W 52/02 |
| 10,257,803 | B2 * | 4/2019 | Guo | H04W 8/04 |
| 10,275,800 | B2 * | 4/2019 | Shaw | H04L 51/38 |
| 10,278,101 | B2 * | 4/2019 | Chai | H04W 48/16 |
| 10,292,082 | B2 * | 5/2019 | Li | H04W 16/04 |
| 10,306,659 | B2 * | 5/2019 | Han | H04L 1/0038 |
| 10,334,604 | B2 * | 6/2019 | Guo | H04W 8/06 |
| 10,334,639 | B2 * | 6/2019 | Liu | H04W 8/18 |
| 2008/0064398 | A1 | 3/2008 | Zhu | |
| 2011/0136482 | A1 | 6/2011 | Kaliner | |
| 2011/0300832 | A1 * | 12/2011 | Shaw | H04L 51/38 455/412.1 |
| 2013/0132854 | A1 | 5/2013 | Raleigh et al. | |
| 2013/0196636 | A1 * | 8/2013 | Shaw | H04L 51/38 455/413 |
| 2014/0222576 | A1 * | 8/2014 | Shaw | H04L 51/38 705/14.58 |
| 2015/0350869 | A1 * | 12/2015 | Karshenas Najafabadi | H04W 8/02 455/432.1 |
| 2016/0080931 | A1 * | 3/2016 | Marsden | H04W 12/06 455/411 |
| 2016/0088465 | A1 | 3/2016 | Golla | |
| 2016/0344872 | A1 * | 11/2016 | Mathison | H04M 15/715 |
| 2017/0134931 | A1 | 5/2017 | Arslan et al. | |
| 2017/0201850 | A1 * | 7/2017 | Raleigh | H04W 4/50 |
| 2017/0352060 | A1 * | 12/2017 | Shaw | H04L 51/38 |
| 2019/0028865 | A1 * | 1/2019 | Raleigh | H04W 4/24 |
| 2019/0053135 | A1 * | 2/2019 | Hahn | H04W 72/1226 |
| 2019/0141518 | A1 * | 5/2019 | Lin | H04W 4/025 |

FOREIGN PATENT DOCUMENTS

| | | |
|---|---|---|
| CN | 101123748 A | 2/2008 |
| CN | 101400186 A | 4/2009 |
| CN | 101771692 A | 7/2010 |
| CN | 101998331 A | 3/2011 |
| CN | 102076124 A | 5/2011 |
| CN | 102143447 A | 8/2011 |
| CN | 103037347 A | 4/2013 |
| CN | 103619053 A | 3/2014 |
| CN | 105050071 A | 11/2015 |
| CN | 105530632 A | 4/2016 |
| EP | 1617694 A1 | 1/2006 |
| WO | 2009045138 A1 | 4/2009 |
| WO | 2009141024 A1 | 11/2009 |
| WO | 2015193609 A1 | 12/2015 |

* cited by examiner

METHOD, APPARATUS, AND SYSTEM FOR MANAGING IMSI STATUS OF TERMINAL DEVICE

CROSS-REFERENCE TO RELATED APPLICATIONS

This application is a continuation of International Application No. PCT/CN2016/088296, filed on Jul. 4, 2016, the disclosure of which is hereby incorporated by reference in its entirety.

TECHNICAL FIELD

Embodiments of this application relate to communications technologies, and in particular, to a method, an apparatus, and a system for managing an international mobile subscriber identity (IMSI) status of a terminal device.

BACKGROUND

In a mobile communications system, a function that a plurality of terminal devices share one number enables one mobile subscriber international integrated services digital network (ISDN)/public switched telephone network (PSTN) number (MSISDN) to be corresponding to a plurality of subscriber identity module (SIM) cards, where different international mobile subscriber identities (IMSIs) are used for the SIM cards.

In a scenario in which a plurality of SIM cards share one MSISDN, only a maximum of one SIM card is in an active state at a specific time. During IMSI activation of a terminal device that has a SIM card in an idle state, the terminal device may proactively initiate a location update process to activate an IMSI corresponding to the SIM card.

However, in an Internet of Things (IoT) application scenario, for example, a wearable device may be connected to a network by using a direct link such as an long term evolution (LTE) radio access technology. Alternatively, the wearable device may be first connected to a relay node, and then connected to a network by using the relay node. An IMSI used for a SIM card of the wearable device and an IMSI used for a SIM card of the relay node may share a same MSISDN. In this case, if the wearable device proactively initiates a location update process to activate the IMSI corresponding to the SIM card in the wearable device, power consumption of the wearable device is greatly increased. Therefore, an IMSI management method that can be used to reduce power consumption of the wearable device needs to be designed urgently, to meet a requirement of the Internet of Things application scenario.

SUMMARY

Embodiments of this application provide a method, an apparatus, and a system for managing an IMSI status of a terminal device, to meet a requirement of an Internet of Things application scenario by using an IMSI management method that is used to reduce power consumption of a wearable device.

According to a first aspect, an embodiment of this application provides a method for managing an IMSI status of a terminal device, including: receiving, by a core network node, a first activation request message sent by a first terminal device, where the first activation request message carries an IMSI of a second terminal device and an IMSI status indication of the second terminal device, the first activation request message is used to request the core network node to set the IMSI of the second terminal device to an activated state or a deactivated state, and the IMSI status indication is used to indicate that an IMSI status is the activated state or the deactivated state; setting, by the core network node based on subscription information of the second terminal device, the IMSI of the second terminal device to the activated state or the deactivated state, and updating the IMSI status indication of the second terminal device; and sending, by the core network node, an activation response message to the first terminal device, where the activation response message carries the IMSI of the second terminal device and an updated IMSI status indication of the second terminal device.

According to this embodiment of this application, the core network node receives the first activation request message sent by the first terminal device, where the first activation request message carries the IMSI of the second terminal device and the IMSI status indication of the second terminal device, the first activation request message is used to request the core network node to set the IMSI of the second terminal device to the activated state or the deactivated state, and the IMSI status indication is used to indicate that an IMSI status is the activated state or the deactivated state; sets, based on the subscription information of the second terminal device, the IMSI of the second terminal device to the activated state or the deactivated state, and updates the IMSI status indication of the second terminal device; and finally, sends, to the first terminal device, the activation response message that carries the IMSI of the second terminal device and the updated IMSI status indication of the second terminal device. The IMSI of the second terminal device is activated or deactivated through interaction between the first terminal device and the core network node, so that the second terminal device does not participate in activating or deactivating the IMSI of the second terminal device. Therefore, power consumption of the second terminal device can be reduced, and a requirement of an Internet of Things application scenario can be met. For example, because a wearable device has various connection modes and has a requirement for low power consumption and low costs, the wearable device, such as a smartwatch, may be connected to a network by using a mobile phone, and in this case, the mobile phone may replace the smartwatch to implement an IMSI activation process. This can reduce energy consumption of the smartwatch and reduce costs.

In a first possible embodiment of the first aspect, the setting, by the core network node based on subscription information of the second terminal device, the IMSI of the second terminal device to the activated state or the deactivated state includes: determining, by the core network node, that the IMSI of the second terminal device and an IMSI/IMSIs of one or more terminal devices other than the second terminal device are mapped to a same user identifier, where the user identifier is a mobile subscriber international ISDN/PSTN number MSISDN or a Session Initiation Protocol SIP identifier; obtaining, by the core network node, an IMSI status indication/IMSI status indications of the one or more terminal devices that are mapped to the same user identifier to which the IMSI of the second terminal device is mapped; and setting, by the core network node, the IMSI of the second terminal device to the activated state or the deactivated state based on the subscription information of the second terminal device and the IMSI status indication of the terminal device mapped to the same user identifier to which the IMSI of the second terminal device is mapped.

In a second possible embodiment of the first aspect, the first activation request message further includes a service type corresponding to the IMSI of the second terminal device, and the service type includes at least one of a short message service, voice, and data. In this embodiment, the core network node can configure, for the second terminal device, the service type corresponding to the IMSI of the second terminal device.

In a third possible embodiment of the first aspect, the first activation request message further includes priority information corresponding to an IMSI of the first terminal device and/or priority information corresponding to the IMSI of the second terminal device. In this embodiment, an IMSI activation priority of a terminal device is set, so as to implement flexible management on an IMSI of the terminal device.

In a fourth possible embodiment of the first aspect, the activation response message further includes an updated service type corresponding to the IMSI of the second terminal device and/or updated priority information corresponding to the IMSI of the second terminal device.

In a fifth possible embodiment of the first aspect, the activation response message further includes the IMSI of the first terminal device and an updated IMSI status indication of the first terminal device, and/or an updated service type corresponding to the IMSI of the first terminal device, and/or updated priority information corresponding to the IMSI of the first terminal device.

In a sixth possible embodiment of the first aspect, the first activation request message further includes the IMSI of the first terminal device and an IMSI status indication of the first terminal device. In this embodiment of this application, the first terminal device can not only activate and deactivate an IMSI of another terminal device (such as the second terminal device), but also activate and deactivate the IMSI of the first terminal device. The technical solution can be used to simultaneously activate IMSIs of a plurality of terminal devices (the first terminal device and the second terminal device in this embodiment), where the IMSIs may be corresponding to different service types, so as to meet diversified service requirements.

In a seventh possible embodiment of the first aspect, if the IMSI status indication of the second terminal device in the first activation request message indicates the deactivated state, after the receiving, by a core network node, a first activation request message sent by a first terminal device, the method may further include: determining, by the core network node, that the IMSI of the second terminal device and an IMSI/IMSIs of one or more terminal devices are mapped to a same user identifier, where the user identifier is an MSISDN or a SIP identifier; and when the core network node determines that IMSI statuses of the terminal devices mapped to the user identifier are all set to the deactivated state, determining, based on the subscription information of the second terminal device, to set the IMSI of the second terminal device to the activated state; or when the core network node determines that IMSI statuses of the terminal devices mapped to the user identifier are all set to the deactivated state, determining, based on subscription information of the one or more terminal devices, to set an IMSI of any of the one or more terminal devices to the activated state.

In an eighth possible embodiment of the first aspect, if the IMSI status indication of the first terminal device and/or the IMSI status indication of the second terminal device in the first activation request message indicate/indicates the deactivated state, after the receiving, by a core network node, a first activation request message sent by a first terminal device, the method may further include: determining, by the core network node, that the IMSI of the first terminal device and/or the IMSI of the second terminal device and an IMSI/IMSIs of one or more terminal devices are mapped to a same user identifier, where the user identifier is an MSISDN or a SIP identifier; and when the core network node determines that IMSI statuses of the terminal devices mapped to the user identifier are all set to the deactivated state, determining, based on subscription information of the first terminal device and the subscription information of the second terminal device, to set the IMSI of the first terminal device to the activated state or to set the IMSI of the second terminal device to the activated state; or when the core network node determines that IMSI statuses of the terminal devices mapped to the user identifier are all set to the deactivated state, determining, based on subscription information of the one or more terminal devices, to set an IMSI of any of the one or more terminal devices to the activated state.

In a ninth possible embodiment of the first aspect, if the core network node determines to set the IMSI of any of the one or more terminal devices to the activated state, the first activation response message further includes the IMSI of the terminal device that is set to the activated state and that is of the one or more terminal devices and an IMSI status indication of the terminal device that is set to the activated state and that is of the one or more terminal devices.

In a tenth possible embodiment of the first aspect, after the core network node determines the terminal device that is set to the activated state, the method may further include: sending, by the core network node, a second activation request message to the terminal device that is set to the activated state, where the second activation request message carries the IMSI of the terminal device that is set to the activated state, the IMSI status indication of the terminal device that is set to the activated state, and an updated service type corresponding to the IMSI of the terminal device that is set to the activated state. In this embodiment, the core network node proactively initiates an IMSI activation or deactivation process, and the terminal device activates or deactivates the IMSI of the terminal device, thereby increasing diversity of IMSI status management of the terminal device.

According to a second aspect, an embodiment of this application provides a method for managing an IMSI status of a terminal device, including: sending, by a first terminal device, a first activation request message to a core network node, where the first activation request message carries an IMSI of a second terminal device and an IMSI status indication of the second terminal device, the first activation request message is used to request the core network node to set the IMSI of the second terminal device to an activated state or a deactivated state, and the IMSI status indication is used to indicate that an IMSI status is the activated state or the deactivated state; and receiving, by the first terminal device, an activation response message sent by the core network node, where the activation response message carries the IMSI of the second terminal device and an updated IMSI status indication of the second terminal device, and the updated IMSI status indication of the second terminal device is an IMSI status indication of the second terminal device that is updated after the core network node sets, based on subscription information of the second terminal device, the IMSI of the second terminal device to the activated state or the deactivated state.

In this embodiment of this application, the IMSI of the second terminal device is activated or deactivated through interaction between the first terminal device and the core network node, so that the second terminal device does not participate in activating or deactivating the IMSI of the second terminal device. Therefore, power consumption of the second terminal device can be reduced, and a requirement of an Internet of Things application scenario can be met. For example, because a wearable device has various connection modes and has a requirement for low power consumption and low costs, the wearable device, such as a smartwatch, may be connected to a network by using a mobile phone, and in this case, the mobile phone may replace the smartwatch to implement an IMSI activation process. This can reduce energy consumption of the smartwatch and reduce costs.

In a first possible embodiment of the second aspect, before the sending, by a first terminal device, a first activation request message to a core network node, the method may further include: receiving, by the first terminal device, a third activation request message sent by the second terminal device, where the third activation request message carries the IMSI of the second terminal device and the IMSI status indication of the second terminal device; and correspondingly, after the receiving, by the first terminal device, an activation response message sent by the core network node, the method further includes: sending, by the first terminal device, the activation response message to the second terminal device.

In a second possible embodiment of the second aspect, the third activation request message further includes a service type corresponding to the IMSI of the second terminal device, and the service type includes at least one of a short message service, voice, and data. Correspondingly, the first activation request message may further include the service type corresponding to the IMSI of the second terminal device, and the service type includes at least one of a short message service, voice, and data.

In a third possible embodiment of the second aspect, the first activation request message is generated based on the third activation request message.

In a fourth possible embodiment of the second aspect, the first activation request message further includes an IMSI of the first terminal device and an IMSI status indication of the first terminal device; and correspondingly, the activation response message further includes the IMSI of the first terminal device and an updated IMSI status indication of the first terminal device. In this embodiment of this application, the first terminal device can not only activate and deactivate an IMSI of another terminal device (such as the second terminal device), but also activate and deactivate the IMSI of the first terminal device. The technical solution can be used to simultaneously activate IMSIs of a plurality of terminal devices (the first terminal device and the second terminal device in this embodiment), where the IMSIs may be corresponding to different service types, so as to meet diversified service requirements.

In a fifth possible embodiment of the second aspect, the first activation request message further includes a service type corresponding to the IMSI of the first terminal device, and the service type includes at least one of a short message service, voice, and data.

In a sixth possible embodiment of the second aspect, the first activation request message further includes priority information corresponding to the IMSI of the first terminal device and/or priority information corresponding to the IMSI of the second terminal device. In this embodiment, an IMSI activation priority of a terminal device is set, so as to implement flexible management on an IMSI of the terminal device.

In a seventh possible embodiment of the second aspect, the activation response message further includes at least one of an updated service type corresponding to the IMSI of the second terminal device, updated priority information corresponding to the IMSI of the second terminal device, an updated service type corresponding to the IMSI of the first terminal device, and updated priority information corresponding to the IMSI of the first terminal device.

In an eighth possible embodiment of the second aspect, before the sending, by a first terminal device, a first activation request message to a core network node, the method may further include: establishing, by the first terminal device, a communications link with the second terminal device, so that the second terminal device is connected to a network by using the first terminal device.

In a ninth possible embodiment of the second aspect, before the sending, by a first terminal device, a first activation request message to a core network node, the method may further include: receiving, by the first terminal device, an operation instruction that is entered by a user and that is used to instruct to send the first activation request message; or generating, by the first terminal device, the first activation request message based on status change information of the first terminal device, where the status change information includes a battery level change and/or a radio link change.

In a tenth possible embodiment of the second aspect, when the IMSI status indication of the first terminal device in the first activation request message indicates the deactivated state, and the IMSI status indication of the second terminal device in the first activation request message indicates the activated state, before the sending, by a first terminal device, a first activation request message to a core network node, the method may further include: determining, by the first terminal device, to deactivate the IMSI of the first terminal device; and selecting, by the first terminal device, the second terminal device as a to-be-activated terminal device based on a pre-stored IMSI status indication of a terminal device that is mapped to a same user identifier to which the IMSI of the first terminal device is mapped, where the user identifier is an MSISDN or a SIP identifier.

In an eleventh possible embodiment of the second aspect, when the IMSI status indication of the second terminal device in the first activation request message indicates the deactivated state, and the IMSI status indication of the first terminal device in the first activation request message indicates the activated state, the first terminal device is a to-be-activated terminal device that is selected by the second terminal device, after determining to deactivate the IMSI of the second terminal device, based on a pre-stored IMSI status indication of a terminal device that is mapped to a same user identifier to which the IMSI of the second terminal device is mapped, where the user identifier is an MSISDN or a SIP identifier.

According to a third aspect, an embodiment of this application provides a method for managing an IMSI status of a terminal device, including: receiving, by a terminal device, a second activation request message sent by a core network node, where the second activation request message carries an IMSI of the terminal device and an IMSI status indication of the terminal device, the second activation request message is used to request the terminal device to set the IMSI of the terminal device to an activated state or a deactivated state, the terminal device is a terminal device that is set to the activated state and that is determined by the core network node based on an IMSI status indication carried in a first activation request message sent by a first terminal device, and the IMSI status indication is used to indicate that an IMSI status is the activated state or the deactivated state; and setting, by the terminal device based on the IMSI status indication of the terminal device, the IMSI of the terminal device to the activated state or the deactivated state.

In this embodiment of this application, the core network node proactively initiates an IMSI activation or deactivation process, and the terminal device activates or deactivates the IMSI of the terminal device, thereby increasing diversity of IMSI status management of the terminal device.

In a first possible embodiment of the third aspect, the second activation request message further includes a service type corresponding to the IMSI of the terminal device, and the service type includes at least one of a short message service, voice, and data. In this embodiment, the core network node can configure, for the terminal device, the service type corresponding to the IMSI of the terminal device.

According to a fourth aspect, an embodiment of this application provides an apparatus for managing an IMSI status of a terminal device, where the apparatus is integrated into a core network node, and the apparatus includes: a receiving module, configured to receive a first activation request message sent by a first terminal device, where the first activation request message carries an IMSI of a second terminal device and an IMSI status indication of the second terminal device, the first activation request message is used to request the core network node to set the IMSI of the second terminal device to an activated state or a deactivated state, and the IMSI status indication is used to indicate that an IMSI status is the activated state or the deactivated state; a processing module, configured to: set, based on subscription information of the second terminal device, the IMSI of the second terminal device received by the receiving module to the activated state or the deactivated state, and update the IMSI status indication of the second terminal device; and a sending module, configured to send an activation response message to the first terminal device, where the activation response message carries the IMSI of the second terminal device and an updated IMSI status indication of the second terminal device obtained by the processing module.

The apparatus and the method design in the first aspect are based on similar considerations as those discussed herein, and problems resolved by the apparatus correspond to solutions enabled by the method in the first aspect. Therefore, for implementation of the apparatus, refer to implementation of the method. Same parts are not described again.

According to a fifth aspect, an embodiment of this application provides an apparatus for managing an IMSI status of a terminal device, where the apparatus is integrated into a first terminal device, and the apparatus includes: a sending module, configured to send a first activation request message to a core network node, where the first activation request message carries an IMSI of a second terminal device and an IMSI status indication of the second terminal device, the first activation request message is used to request the core network node to set the IMSI of the second terminal device to an activated state or a deactivated state, and the IMSI status indication is used to indicate that an IMSI status is the activated state or the deactivated state; and a receiving module, configured to receive an activation response message sent by the core network node, where the activation response message carries the IMSI of the second terminal device and an updated IMSI status indication of the second terminal device, and the updated IMSI status indication of the second terminal device is an IMSI status indication of the second terminal device that is updated after the core network node sets, based on subscription information of the second terminal device, the IMSI of the second terminal device to the activated state or the deactivated state.

The apparatus and the method design in the second aspect are based on similar considerations as those discussed herein, and problems resolved by the apparatus correspond to solutions enabled by the method in the second aspect. Therefore, for implementation of the apparatus, refer to implementation of the method. Same parts are not described again.

According to a sixth aspect, an embodiment of this application provides an apparatus for managing an IMSI status of a terminal device, where the apparatus is integrated into the terminal device, and the apparatus includes: a receiving module, configured to receive a second activation request message sent by a core network node, where the second activation request message carries an IMSI of the terminal device and an IMSI status indication of the terminal device, the second activation request message is used to request the terminal device to set the IMSI of the terminal device to an activated state or a deactivated state, the terminal device is a terminal device that is set to the activated state and that is determined by the core network node based on an IMSI status indication carried in a first activation request message sent by a first terminal device, and the IMSI status indication is used to indicate that an IMSI status is the activated state or the deactivated state; and a processing module, configured to set the IMSI of the terminal device to the activated state or the deactivated state based on the IMSI status indication of the terminal device in the second activation request message received by the receiving module.

The apparatus and the method design in the third aspect are based on similar consideration as those discussed herein, and problems resolved by the the apparatus correspond to solutions enabled by the method in the third aspect. Therefore, for implementation of the apparatus, refer to implementation of the method. Same parts are not described again.

According to a seventh aspect, an embodiment of this application provides a system for managing an IMSI status of a terminal device, including a core network node, a first terminal device, and a second terminal device. The core network node includes the apparatus according to the fourth aspect, the first terminal device includes the apparatus according to the fifth aspect or the sixth aspect, and the second terminal device includes the apparatus according to the sixth aspect.

According to an eighth aspect, an embodiment of this application provides a non-volatile computer readable storage medium for storing one or more programs. The one or more programs include an instruction. When the instruction is executed by a terminal device or a core network node, the terminal device or the core network node is enabled to execute the solutions in the foregoing corresponding method designs. Same parts are not described again.

These aspects and other aspects of this application are more clarified and easier to understand in descriptions of the following (a plurality of) embodiments.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
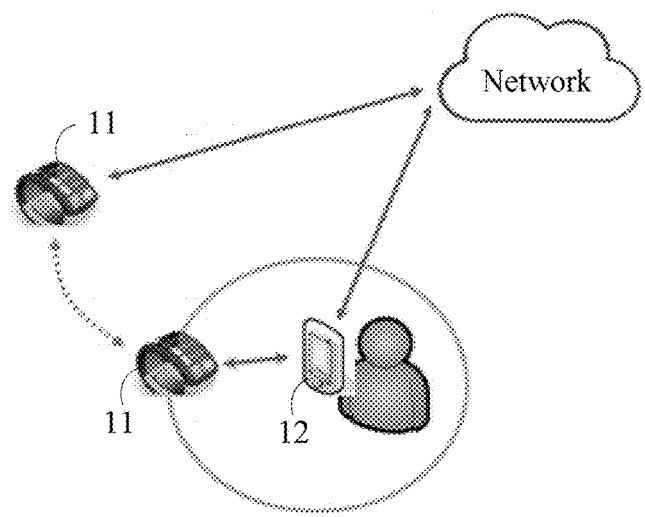
FIG. 1 is a schematic diagram of a connection model of an MIoT device in an MIoT scenario.

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

In the specification, claims, and accompanying drawings of the embodiments of this application, the terms "first", "second", "third", and the like are intended to distinguish between similar objects, but are not necessarily used to indicate a specific order or sequence. It should be understood that data termed in such a way are interchangeable in proper circumstances, so that the embodiments of this application described herein can be implemented in orders different from the order illustrated or described herein. Moreover, the terms "include", "contain", and any variants thereof are intended to cover non-exclusive inclusion. For example, a process, method, system, product, or device that includes a series of steps or units is not necessarily limited to those expressly listed steps or units, but may include other steps or units that are not expressly listed or that are inherent to such a process, method, system, or device.

The terminal device in the embodiments of this application may be a device that provides voice and/or data connectivity for a user, a handheld device with a wireless connection function, or another processing device connected to a wireless modem. The terminal device may communicate with one or more core networks by using a radio access network (RAN). The terminal device may be a mobile terminal device, such as a mobile phone (also referred to as a "cellular" phone) and a computer that has a mobile terminal device, and for example, may be a portable mobile apparatus, a pocket-sized mobile apparatus, a handheld mobile apparatus, a computer built-in mobile apparatus, or an in-vehicle mobile apparatus, where such mobile apparatuses exchange languages and/or data with the radio access network. For example, it may be a device such as a personal communications service (PCS) phone, a cordless telephone set, a Session Initiation Protocol (SIP) phone, a wireless local loop (WLL) station, or a personal digital assistant (PDA). The terminal device may also be referred to as a system, a subscriber unit, a subscriber station, a mobile station, a mobile console (mobile), a remote station, an access point, a remote terminal device, an access terminal device (access terminal), a user terminal device (user terminal), a user agent, a user device, or user equipment.

The technical solutions of this application are applicable to various mobile communications systems that supports mapping a plurality of terminal devices to a same user identifier (that is, a function that the plurality of terminal devices share one number), where the user identifier may include but is not limited to a mobile subscriber international ISDN/PSTN number (MSISDN) and a Session Initiation Protocol (SIP) identifier. The mobile communications systems are, for example, an evolved packet system (EPS), a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, and a Universal Mobile Telecommunications System (UMTS). This is not limited in this application.

The embodiments of this application are applicable to the following scenario: massive Internet of Things (MIoT). MIoT is mainly an application scenario in which massive sensors are deployed in fields such as measurement, architecture, agriculture, logistics, smart city, and home. Such sensors are deployed very densely. This requires that a network can support massive device connections. A typical application scenario of MIoT is a wearable device. The wearable device, such as a smart band, a smartwatch, or smart glasses, is a computer device that is worn and controlled by a user and that continuously runs and performs collaborative interaction. Currently, the wearable device is majorly used for medical treatment and health care, and is also mainly applied to information entertainment and exercise for fitness.

The 3rd Generation Partnership Project (3GPP) provides a connection model of an MIoT device in an MIoT scenario. As shown in FIG. 1, an MIoT device 11 may be connected to a network in various manners. The MIoT device 11 may be connected to the network by using a direct link; or the MIoT device 11 may be first connected to a relay node (such as a mobile phone) 12, and then connected to the network by using the relay node 12.

Figure 2:
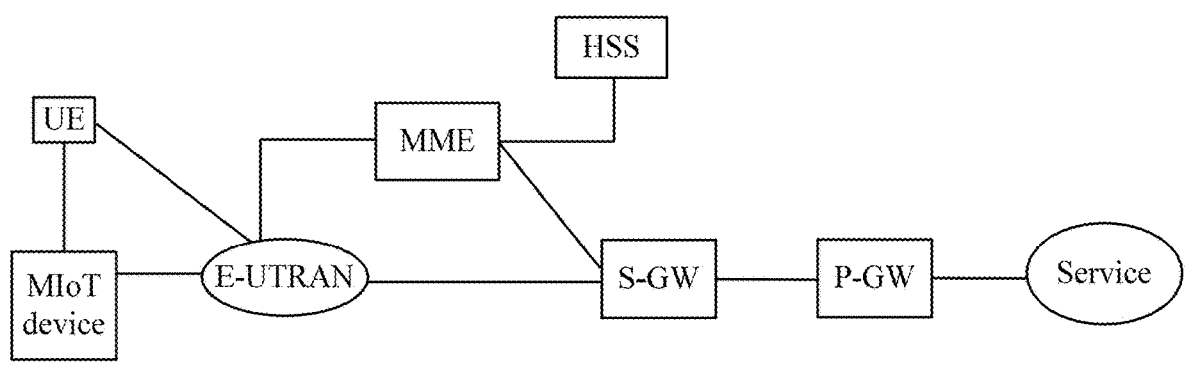
FIG. 2 is a schematic diagram of an EPS network architecture according to this application.

FIG. 2 is a schematic diagram of an EPS network architecture according to this application. The EPS network architecture is end-to-end all IP networking and a flattened network structure, and compatibility with an existing 2nd generation mobile telecommunications (2G)/3rd generation mobile telecommunications (3G) network is fully considered for the EPS network architecture. As shown in FIG. 2, functions of main network entities of the EPS network are as follows.

An evolved universal terrestrial radio access network (E-UTRAN) is a network including a plurality of evolved NodeBs (eNB), and implements a wireless physical layer function, resource scheduling and radio resource management, radio access control, and a mobility management function. An eNB is connected to a serving gateway (S-GW) by using a user plane interface S1-U, and is configured to transfer user data; and is connected to a mobility management entity (MME) by using a control plane interface S1-MME, and implements, by using an S1-AP protocol, a function such as radio access bearer control.

An MME is mainly responsible for all control plane functions of user and session management, including non-access stratum (NAS) signaling and security, tracking area management, selection of core-network network elements such as a packet data network gateway (P-GW) and an S-GW, and the like, and is corresponding to a control plane part of an SGSN inside a current UMTS system.

An S-GW is mainly responsible for data transmission and forwarding of user equipment (UE), routing switching, and the like, and serves as a local mobility anchoring point when the UE is handed over between eNBs. Only one S-GW serves one user equipment at one moment.

A P-GW is a connection anchoring point of a public data network (PDN), and is responsible for Internet Protocol (IP) address allocation to UE, data packet filtering for the UE, rate control, charging information generation, and the like.

A home subscriber server (HSS) is configured to store subscription information of a subscriber.

In the embodiments of this application, the HSS is specifically configured to store an IMSI status of a terminal device and a mapping relationship between an IMSI of the terminal device and a user identifier. The MME or a serving GPRS support node (SGSN) is specifically configured to: store the IMSI status of the terminal device and the mapping relationship between the IMSI of the terminal device and the user identifier; process an IMSI activation management message initiated by the terminal device; proactively request IMSI activation management from the terminal device; select an IMSI activation replacement device; and the like. The terminal device is specifically configured to: store the IMSI status of the terminal device and the mapping relationship between the IMSI of the terminal device and the user identifier (where the IMSI status of the terminal device is optional); proactively initiate IMSI activation management to a network, including replacing another device to implement IMSI activation management; process an IMSI activation management message initiated by the network; select an IMSI activation replacement device; and the like.

Figure 3:
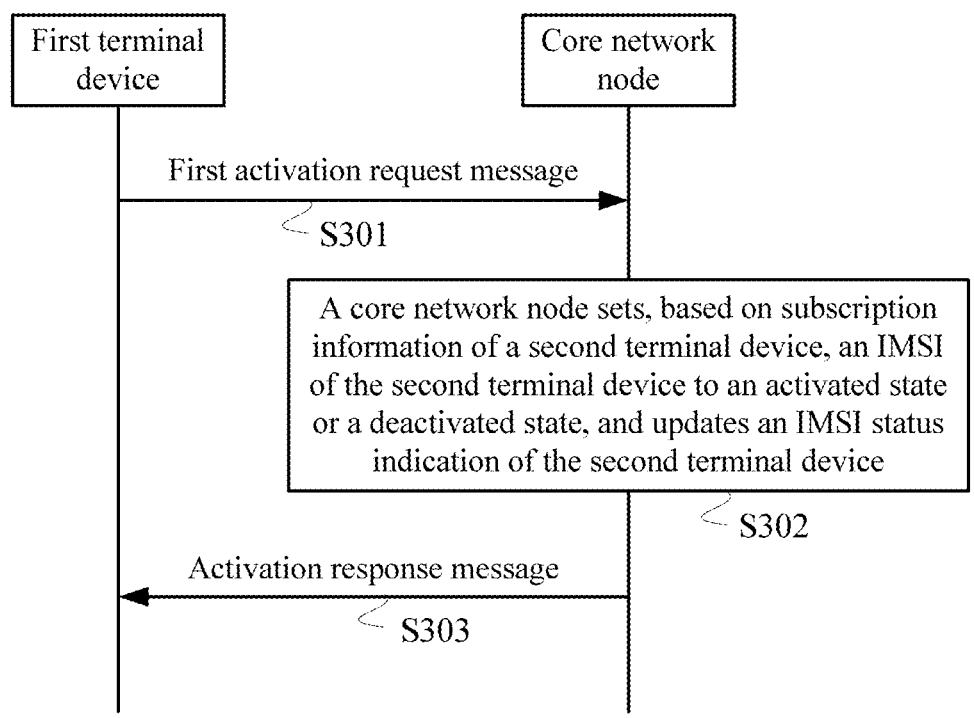
FIG. 3 is a schematic diagram of signaling interaction in Embodiment 1 of a method for managing an IMSI status of a terminal device according to this application.

FIG. 3 is a schematic diagram of signaling interaction in Embodiment 1 of a method for managing an IMSI status of a terminal device according to this application. This embodiment of this application provides a method for managing an IMSI status of a terminal device, where a core network node may be, for example, an MME or an SGSN. As shown in FIG. 3, the method includes the following steps.

S301. A first terminal device sends a first activation request message to a core network node.

The first activation request message carries an IMSI of a second terminal device and an IMSI status indication of the second terminal device. The first activation request message is used to request the core network node to set the IMSI of the second terminal device to an activated state or a deactivated state. The IMSI status indication is used to indicate that an IMSI status is the activated state or the deactivated state.

Correspondingly, the core network node receives the first activation request message.

For example, the first activation request message may be implemented by extending an existing attachment/tracking area update (TAU) request message, for example, adding a new message field to the attachment/TAU request message to carry information used for IMSI management; or may be implemented by using a newly defined message that is specially used for activation management. This is not limited in this embodiment of this application.

In this embodiment, a communications link is established between the second terminal device and the first terminal device, and IMSI activation or deactivation setting of the second terminal device is implemented by using the first terminal device. For example, when the second terminal device is a smartwatch, and the first terminal device is a smartphone, the smartwatch implements IMSI activation or deactivation setting of the smartwatch by using the smartphone connected to the smartwatch. Specifically, a communications link is established between the smartphone and the smartwatch, and the smartphone and the smartwatch may perform communication by using a technology such as device-to-device (D2D)/Bluetooth/Wireless Fidelity (Wi-Fi).

It should be noted that, in any embodiment of this application, the first terminal device and the second terminal device share one user identifier, where the user identifier may be an MSISDN or a public user identity (PUI). The following separately describes the MSISDN and the PUI.

1. MSISDN

The MSISDN is a number that a calling user needs to dial to call a mobile subscriber. A function of the MSISDN is the same as that of a PSTN number on a rigid network. The MSISDN is a number that can uniquely identify a mobile subscriber in a public telephone network switching network numbering plan.

The MSISDN is defined in the E.164 encoding manner, and includes the following parts as suggested by the Consultative Committee of International Telegraph and Telephone (CCITT):

MSISDN=CC+NDC+SN.

CC is a country code. For example, the country code of China is 86. NDC is a national destination code, and may also be referred to as a network access number. For example, network access numbers of China Mobile are 134 to 139, 150 to 152, or 188, network access numbers of China Unicom are 130 to 132 or 185 and 186, and network access numbers of China Telecom are 133, 153, 180, or 189. SN is a subscriber number.

If the country code CC is removed from the foregoing number, a remaining part is a national identity number of a mobile station, that is, a daily used "mobile number".

2. Public User Identity

The public user identity is an identification that a user makes public, and is used to communicate with another user. Different public user identities are corresponding to different services of the user. The public user identity may be a uniform resource identifier (URI). The URI is defined by the Request For Comments (RFC) 2396, identifies an abstract resource or a physical resource by using some concise strings, and is used to uniquely identify a specific category of uniform resources. A telephone (TEL)-URI and a SIP-URI are two common URIs, and identify a user or a network resource by using a TEL number and a SIP number respectively.

The TEL-URI identifies a user in a manner of "TEL: user number". Generally, the user number is defined by using an international public telephone numbering plan: the E.164 format defined by the International Telecommunication Union, namely, a common format of a telephone number or a mobile number. For example, 867711234567 and 8613912345678 are common TEL-URI formats.

The SIP-URI identifies a user in a manner of "SIP: username@domain name". The username may be an all-digit user number, or may be a username starting with a letter. For example, sip:7711234567@gx.cn and gx1234567@china.com are common SIP-URI formats.

S302. The core network node sets, based on subscription information of the second terminal device, the IMSI of the second terminal device to the activated state or the deactivated state, and updates the IMSI status indication of the second terminal device.

For an implementation of obtaining the subscription information of the second terminal device by the core network node, a person skilled in the art may understand that, when the first terminal device and the second terminal device attach to the core network node, the core network node obtains subscription information of the first terminal device and the subscription information of the second terminal device from an HSS, and stores the subscription information. Therefore, the core network node may locally obtain the subscription information of the second terminal device, or the core network node may obtain the subscription information of the second terminal device from the HSS.

Specifically, after receiving the first activation request message sent by the first terminal device, the core network node obtains the subscription information of the second terminal device, where the subscription information includes the IMSI status indication of the second terminal device. For example, the IMSI status indication of the second terminal device indicates the activated state or the deactivated state. The subscription information may further include a mapping relationship between an IMSI and a user identifier, and herein include an IMSI of the first terminal device and the IMSI of the second terminal device that are mapped to a same user identifier. Then, the core network node sets, based on the subscription information of the second terminal device, the IMSI of the second terminal device to the activated state or the deactivated state, and updates the IMSI status indication of the second terminal device.

A person skilled in the art may understand that, after performing S302, the core network node generates an activation response message. The activation response message carries the IMSI of the second terminal device and an updated IMSI status indication of the second terminal device.

S303. The core network node sends an activation response message to the first terminal device.

Correspondingly, the first terminal device receives the activation response message sent by the core network node.

Corresponding to the first activation request message, the activation response message may be implemented by extending an existing attachment/TAU request message, for example, adding a new message field to the attachment/TAU request message to carry information used for IMSI management; or may be implemented by using a newly defined message that is specially used for activation management. This is not limited in this embodiment of this application.

In this embodiment of this application, the core network node receives the first activation request message sent by the first terminal device, where the first activation request message carries the IMSI of the second terminal device and the IMSI status indication of the second terminal device, the first activation request message is used to request the core network node to set the IMSI of the second terminal device to the activated state or the deactivated state, and the IMSI status indication is used to indicate that an IMSI status is the activated state or the deactivated state; sets, based on the subscription information of the second terminal device, the IMSI of the second terminal device to the activated state or the deactivated state, and updates the IMSI status indication of the second terminal device; and finally, sends, to the first terminal device, the activation response message that carries the IMSI of the second terminal device and the updated IMSI status indication of the second terminal device. The IMSI of the second terminal device is activated or deactivated through interaction between the first terminal device and the core network node, so that the second terminal device does not participate in activating or deactivating the IMSI of the second terminal device. Therefore, power consumption of the second terminal device can be reduced, and a requirement of an Internet of Things application scenario can be met. For example, because a wearable device has various connection modes and has a requirement for low power consumption and low costs, the wearable device, such as a smartwatch, may be connected to a network by using a mobile phone, and in this case, the mobile phone may replace the smartwatch to implement an IMSI activation process. This can reduce energy consumption of the smartwatch and reduce costs.

In actual application, a user expects to receive or send an SMS message by using the smartwatch while using the mobile phone to answer a call. However, in some systems, only a maximum of one SIM card is active at a specific time. Therefore, the foregoing requirement of simultaneously using the mobile phone and the smartwatch cannot be met. In this embodiment of this application, the IMSI of the second terminal device may be activated through interaction between the first terminal device and the core network node. In other words, the IMSI of the first terminal device and the IMSI of the second terminal device may be in the activated state at the same time. In this way, the user requirement of simultaneously using the mobile phone and the smartwatch can be met.

Based on the foregoing embodiment, in a specific implementation, the setting, by the core network node based on subscription information of the second terminal device, the IMSI of the second terminal device to the activated state or the deactivated state may be specifically: determining, by the core network node, that the IMSI of the second terminal device and an IMSI/IMSIs of one or more terminal devices other than the second terminal device are mapped to a same user identifier, where the user identifier may be an MSISDN or a SIP identifier; obtaining, by the core network node, an IMSI status indication/IMSI status indications of the one or more terminal devices that are mapped to the same user identifier to which the IMSI of the second terminal device is mapped; and determining, by the core network node, to set the IMSI of the second terminal device to the activated state or the deactivated state based on the subscription information of the second terminal device and the IMSI status indication of the terminal device mapped to the same user identifier to which the IMSI of the second terminal device is mapped.

In the specific implementation, first, the core network node determines an IMSI of another terminal device that shares the same user identifier with the IMSI of the second terminal device, and obtains an IMSI status indication of the another terminal device. For example, the IMSI of the another terminal device is in the activated state and/or the deactivated state, where an IMSI status indication of one terminal device indicates one of the activated state and the deactivated state. Then, the core network node determines to set the IMSI of the second terminal device to the activated state or the deactivated state based on the subscription information of the second terminal device and the IMSI status indication of the another terminal device.

Optionally, the first activation request message may further include a service type corresponding to the IMSI of the second terminal device. The service type may include at least one of a short message service, voice, data, and the like. In this embodiment, the core network node can configure, for the second terminal device, the service type corresponding to the IMSI of the second terminal device.

Further, the first activation request message may further include priority information corresponding to an IMSI of the first terminal device and/or priority information corresponding to the IMSI of the second terminal device. A person skilled in the art may understand that: the first activation request message may include the priority information corresponding to the IMSI of the first terminal device; or the first activation request message may include the priority information corresponding to the IMSI of the second terminal device; or the first activation request message may include the priority information corresponding to the IMSI of the first terminal device and the priority information corresponding to the IMSI of the second terminal device. The priority information corresponding to the IMSI is used to indicate a priority for activating the IMSI. For example, if a priority corresponding to the IMSI of the first terminal device is higher than that corresponding to the IMSI of the second terminal device, during activation of the IMSI of the first terminal device and the IMSI of the second terminal device, the IMSI of the first terminal device is activated first, and then the IMSI of the second terminal device is activated. In this embodiment, an IMSI activation priority of a terminal device is set, so as to implement flexible management on an IMSI of the terminal device.

Corresponding to the first activation request message, the activation response message may also include an updated service type corresponding to the IMSI of the second terminal device and/or updated priority information corresponding to the IMSI of the second terminal device. In other words, the activation response message may include the updated service type corresponding to the IMSI of the second terminal device; or the activation response message may include the updated priority information corresponding to the IMSI of the second terminal device; or the activation response message may include the updated service type corresponding to the IMSI of the second terminal device and the updated priority information corresponding to the IMSI of the second terminal device.

In addition, the activation response message may further include the IMSI of the first terminal device and an updated IMSI status indication of the first terminal device, and/or an updated service type corresponding to the IMSI of the first terminal device, and/or updated priority information corresponding to the IMSI of the first terminal device. The "and/or" means including any one of the foregoing or any combination thereof. For example, the activation response message further includes the IMSI of the first terminal device and the updated IMSI status indication of the first terminal device; or the activation response message further includes the updated service type corresponding to the IMSI of the first terminal device; or the activation response message further includes the IMSI of the first terminal device, the updated IMSI status indication of the first terminal device, and the updated priority information corresponding to the IMSI of the first terminal device. Other examples are not described herein one by one.

Further, the first activation request message may further include the IMSI of the first terminal device and an IMSI status indication of the first terminal device. To be specific, in this embodiment of this application, the first terminal device can not only activate and deactivate an IMSI of another terminal device (such as the second terminal device), but also activate and deactivate the IMSI of the first terminal device. The technical solution can be used to simultaneously activate IMSIs of a plurality of terminal devices (the first terminal device and the second terminal device in this embodiment), where the IMSIs may be corresponding to different service types, so as to meet diversified service requirements.

For example, if the IMSI status indication of the second terminal device in the first activation request message indicates the deactivated state, after the core network node receives the first activation request message sent by the first terminal device, the method may further include: determining, by the core network node, that the IMSI of the second terminal device and an IMSI/IMSIs of one or more terminal devices are mapped to a same user identifier, where the user identifier is an MSISDN or a SIP identifier; and when the core network node determines that IMSI statuses of the terminal devices mapped to the user identifier are all set to the deactivated state, determining, based on the subscription information of the second terminal device, to set the IMSI of the second terminal device to the activated state; or when the core network node determines that IMSI statuses of the terminal devices mapped to the user identifier are all set to the deactivated state, determining, based on subscription information of the one or more terminal devices, to set an IMSI of any of the one or more terminal devices to the activated state.

For example, if the IMSI status indication of the first terminal device and/or the IMSI status indication of the second terminal device in the first activation request message indicate/indicates the deactivated state, after the core network node receives the first activation request message sent by the first terminal device, the method may further include: determining, by the core network node, the IMSI of the first terminal device and/or the IMSI of the second terminal device and an IMSI/IMSIs of one or more terminal devices are mapped to a same user identifier, where the user identifier is an MSISDN or a SIP identifier; and when the core network node determines that IMSI statuses of the terminal devices mapped to the user identifier are all set to the deactivated state, determining, based on subscription information of the first terminal device and the subscription information of the second terminal device, to set the IMSI of the first terminal device to the activated state or to set the IMSI of the second terminal device to the activated state; or when the core network node determines that IMSI statuses of the terminal devices mapped to the user identifier are all set to the deactivated state, determining, based on subscription information of the one or more terminal devices, to set an IMSI of any of the one or more terminal devices to the activated state.

When the core network node determines to set the IMSI of any of the one or more terminal devices to the activated state, the first activation response message may further include the IMSI of the terminal device that is set to the activated state and that is of the one or more terminal devices and an IMSI status indication of the terminal device that is set to the activated state and that is of the one or more terminal devices.

Optionally, after the core network node determines the terminal device that is set to the activated state, the method may further include: sending, by the core network node, a second activation request message to the terminal device that is set to the activated state, where the second activation request message carries the IMSI of the terminal device that is set to the activated state, the IMSI status indication of the terminal device that is set to the activated state, and an updated service type corresponding to the IMSI of the terminal device that is set to the activated state.

Correspondingly, the terminal device (namely, the terminal device that is set to the activated state, for example, the first terminal device) receives the second activation request message sent by the core network node, where the second activation request message carries the IMSI of the terminal device and the IMSI status indication of the terminal device, the second activation request message is used to request the terminal device to set the IMSI of the terminal device to the activated state or the deactivated state, and the IMSI status indication is used to indicate that an IMSI status is the activated state or the deactivated state; and sets, based on the second activation request message, the IMSI of the terminal device to the activated state or the deactivated state.

In this embodiment, the core network node proactively initiates an IMSI activation or deactivation process, and the terminal device activates or deactivates the IMSI of the terminal device, thereby increasing diversity of IMSI status management of the terminal device.

Optionally, the second activation request message may further include a service type corresponding to the IMSI of the terminal device. The service type may include at least one of a short message service, voice, data, and the like. In this embodiment, IMSIs of different terminal devices may be corresponding to different service types, so that diverse service requirements of a user are met.

In the foregoing embodiment, a specific process in which the core network node sets, based on the subscription information of the second terminal device, the IMSI of the second terminal device to the activated state or the deactivated state is as follows.

First, the core network node determines, based on the subscription information of the second terminal device, whether the IMSI of the second terminal device is allowed to be connected to a network. Only an IMSI of a terminal device that is allowed to be connected to the network can be set to be activated. In addition, if the first activation request message further carries information such as a service or a priority corresponding to the IMSI of the second terminal device, the core network node further needs to determine whether the information is consistent with the subscription information of the second terminal device. If the information is inconsistent with the subscription information of the second terminal device, the first activation request message is rejected, or the information is set based on the subscription information of the second terminal device.

Then, the core network node further needs to set the IMSI of the second terminal device to the activated state or the deactivated state based on IMSI status indication information of another terminal device that shares a same user identifier with the second terminal device. For example, if an IMSI of a third terminal device and the IMSI of the second terminal device share the same user identifier, possible IMSI status indications of the third terminal device may include the following.

(1) An IMSI status is the activated state, and the third terminal device has a service that is being performed. In this case, the core network node sets the IMSI of the second terminal device to the deactivated state, and may add a proper cause value to an activation response message, for example, another terminal device is already activated. Further, the core network node may further consider services corresponding to IMSIs of different terminal devices. If different services respectively corresponding to the IMSI of the second terminal device and the IMSI of the third terminal device do not affect each another, the IMSI of the second terminal device is set to the activated state.

(2) An IMSI status is the activated state, and the third terminal device has no service that is being performed. In this case, the core network node sets the IMSI of the second terminal device to the activated state, and simultaneously sets the IMSI of the third terminal device to the deactivated state; or sets the IMSI of the second terminal device and the IMSI of the third terminal device to the activated state, and sets a priority of the IMSI of the second terminal device and a priority of the IMSI of the third terminal device.

(3) An IMSI status is the deactivated state. In this case, the core network node sets the IMSI of the second terminal device to the activated state. Further, the core network node may further activate or deactivate IMSIs of terminal devices based on services and priority information corresponding to the IMSIs of the different terminal devices.

Figure 4:
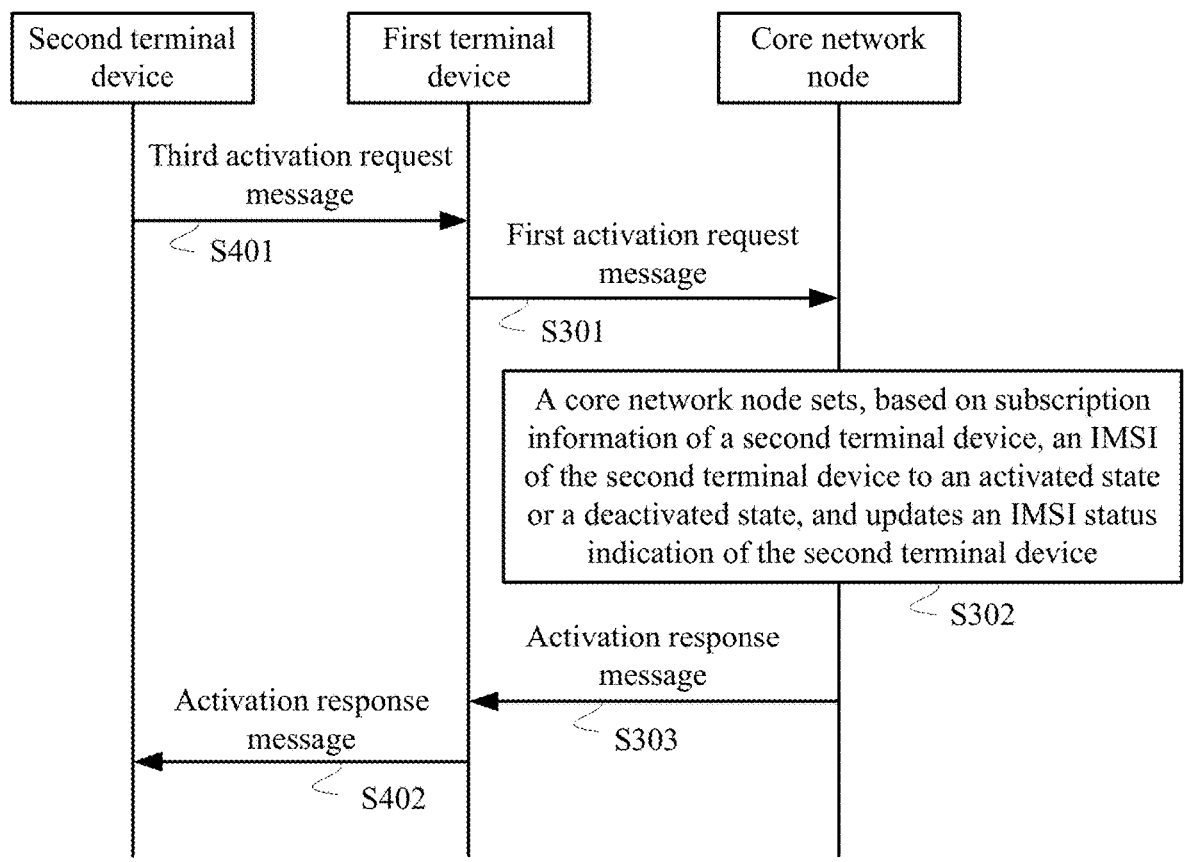
FIG. 4 is a schematic diagram of signaling interaction in Embodiment 2 of a method for managing an IMSI status of a terminal device according to this application.

FIG. 4 is a schematic diagram of signaling interaction in Embodiment 2 of a method for managing an IMSI status of a terminal device according to this application. As shown in FIG. 4, based on the embodiment shown in FIG. 3, the method may further include the following steps.

S401. A first terminal device receives a third activation request message sent by a second terminal device.

The third activation request message carries an IMSI of the second terminal device and an IMSI status indication of the second terminal device.

The step is performed before S301.

S402. The first terminal device sends an activation response message to the second terminal device.

The step is performed after S303.

It can be learned from comparison between the embodiment shown in FIG. 3 and the embodiment shown in FIG. 4 that: referring to FIG. 3, the first terminal device may manage IMSIs of all other terminal devices including the second terminal device, and the first terminal device initiates an IMSI activation or deactivation process for the second terminal device, where in the process, the second terminal device does not participate in activating or deactivating the IMSI of the second terminal device; referring to FIG. 4, the first terminal device may alternatively initiate, upon triggering by the second terminal device, an IMSI activation or deactivation process for the second terminal device.

Optionally, the third activation request message in the embodiment shown in FIG. 4 may further include a service type corresponding to the IMSI of the second terminal device. The service type includes at least one of a short message service, voice, and data. The first activation request message is generated based on the third activation request message. To be specific, the first activation request message and the third activation request message may be the same or may be different, and this is described below.

In an implementation, the first activation request message may further include an IMSI of the first terminal device and an IMSI status indication of the first terminal device. Information carried in the third activation request message all relates to the second terminal device, and the first activation request message further carries information related to the first terminal device. Therefore, the first activation request message and the third activation request message are different in this case. Correspondingly, the activation response message may further include the IMSI of the first terminal device and an updated IMSI status indication of the first terminal device.

For example, before step 401, the method may further include: establishing, by the first terminal device, a communications link with the second terminal device. In other words, the second terminal device is connected to a network by using the first terminal device. For example, a smartwatch is connected to the network by using a mobile phone.

In the foregoing embodiments, that the first terminal device sends the first activation request message to the core network node may be triggered by the following conditions.

Condition 1: Triggered by a user: The first terminal device receives an operation instruction that is entered by the user and that is used to instruct to send the first activation request message. For example, the user may trigger, based on a status change of the user by using an application program, the first terminal device to initiate an IMSI activation/deactivation process.

Condition 2: Triggered by the first terminal device: The first terminal device generates the first activation request message based on status change information of the first terminal device. The status change information may include a battery level change and/or a radio link change, and the like. For example, when detecting that a battery level is low, the smartphone deactivates an IMSI of the smartphone, or changes a service type corresponding to the IMSI of the smartphone from the SMS and voice to the SMS. Other examples are not described herein one by one.

When the first activation request message carries the IMSI status indication of the first terminal device and the IMSI status indication of the second terminal device, description is provided by using the following two cases.

In a first case, the IMSI status indication of the first terminal device in the first activation request message indicates the deactivated state, and the IMSI status indication of the second terminal device in the first activation request message indicates the activated state. In this case, before the first terminal device sends the first activation request message to the core network node, the method may further include: determining, by the first terminal device, to deactivate the IMSI of the first terminal device; and selecting, by the first terminal device, the second terminal device as a to-be-activated terminal device based on a pre-stored IMSI status indication of a terminal device that is mapped to a same user identifier to which the IMSI of the first terminal device is mapped.

In a second case, the IMSI status indication of the second terminal device in the first activation request message indicates the deactivated state, and the IMSI status indication of the first terminal device in the first activation request message indicates the activated state. In this case, the first terminal device is a to-be-activated terminal device that is selected by the second terminal device, after determining to deactivate the IMSI of the second terminal device, based on a pre-stored IMSI status indication of a terminal device that is mapped to a same user identifier to which the IMSI of the second terminal device is mapped.

In the foregoing two cases, execution bodies that select the to-be-activated terminal device are different. In the first case, the first terminal device determines to deactivate the IMSI of the first terminal device, and then selects the second terminal device as the to-be-activated terminal device; and in the second case, the second terminal device determines to deactivate the IMSI of the second terminal device, and then selects the first terminal device as the to-be-activated terminal device.

In all the foregoing embodiments, a case in which the first terminal device can activate/deactivate an IMSI of another terminal device, for example, the IMSI of the second terminal device, is described.

The following describes a case in which the first terminal device may alternatively activate/deactivate only the IMSI of the first terminal device.

Figure 5:
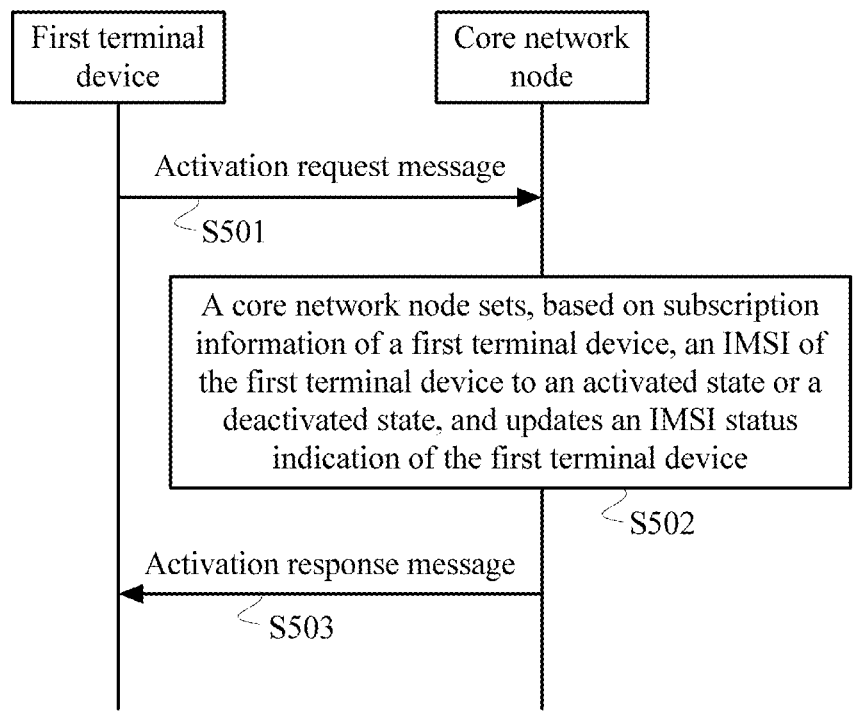
FIG. 5 is a schematic diagram of signaling interaction in Embodiment 3 of a method for managing an IMSI status of a terminal device according to this application.

FIG. 5 is a schematic diagram of signaling interaction in Embodiment 3 of a method for managing an IMSI status of a terminal device according to this application. As shown in FIG. 5, the method includes the following steps.

S501. A first terminal device sends an activation request message to a core network node.

The activation request message carries an IMSI of the first terminal device, an IMSI status indication of the first terminal device, and a service type corresponding to the IMSI of the first terminal device. The activation request message is used to request the core network node to set the IMSI of the first terminal device to an activated state or a deactivated state. The IMSI status indication is used to indicate that an IMSI status is the activated state or the deactivated state, and the service type includes at least one of a short message service, voice, and data.

Correspondingly, the core network node receives the activation request message.

S502. The core network node sets, based on subscription information of the first terminal device, the IMSI of the first terminal device to the activated state or the deactivated state, and updates the IMSI status indication of the first terminal device.

For this step, refer to specific descriptions about setting, by the core network node based on the subscription information of the second terminal device, the IMSI of the second terminal device to the activated state or the deactivated state. Details are not described herein again.

S503. The core network node sends an activation response message to the first terminal device.

Correspondingly, the first terminal device receives the activation response message sent by the core network node.

The activation response message carries the IMSI of the first terminal device, an updated IMSI status indication of the first terminal device, and an updated service type corresponding to the IMSI of the first terminal device. It should be further noted that, the activation response message in the embodiment shown in FIG. 5 is different from the activation response messages in the foregoing embodiments.

A difference between this embodiment and some systems lies in that, in this embodiment of this application, the activation request message carries the service type corresponding to the IMSI of the first terminal device. In this way, in this embodiment of this application, when IMSIs of a plurality of terminal devices (including the first terminal device) are simultaneously activated, the IMSIs of the all terminal devices may be corresponding to different service types, so that diverse service requirements of a user are met.

The activation request message may further include priority information corresponding to the IMSI of the first terminal device, so that respective priorities are considered during activation/deactivation of IMSIs of a plurality of terminal devices, and an IMSI of a terminal device with a high priority is preferentially activated. This implements flexible management of IMSI activation/deactivation of the terminal device.

Optionally, before the first terminal device sends the activation request message to the core network node, the method may further include: receiving, by the first terminal device, an operation instruction that is entered by a user and that is used to instruct to send the activation request message; or generating, by the first terminal device, the activation request message based on status change information of the terminal device, where the status change information may include a battery level change and/or a radio link change, and the like.

If the IMSI status indication of the first terminal device in the activation request message indicates the deactivated state, the activation response message in the embodiment shown in FIG. 5 may further include an IMSI of a second terminal device and an IMSI status indication of the second terminal device. The IMSI status indication of the second terminal device indicates the activated state. The second terminal device is a to-be-activated terminal device that is selected by the core network node based on a pre-stored IMSI status indication of a terminal device that is mapped to a same user identifier to which the IMSI of the first terminal device is mapped. In this implementation, after the first terminal device determines to deactivate the IMSI of the first terminal device, the core network node selects the second terminal device as the to-be-activated terminal device.

A person of ordinary skill in the art may understand that some or all of the steps of the method embodiments may be implemented by a program instructing relevant hardware. The program may be stored in a computer-readable storage medium. During execution of the program, steps in the foregoing method embodiments are performed. The storage medium includes various media that can store program code, such as a read-only memory (ROM), a random access memory (RAM), a magnetic disk, or an optical disc.

The following are apparatus embodiments of this application, and the apparatus embodiments may be used to execute the method embodiments of this application. For details not disclosed in the apparatus embodiments of this application, refer to the method embodiments of this application.

Figure 6:
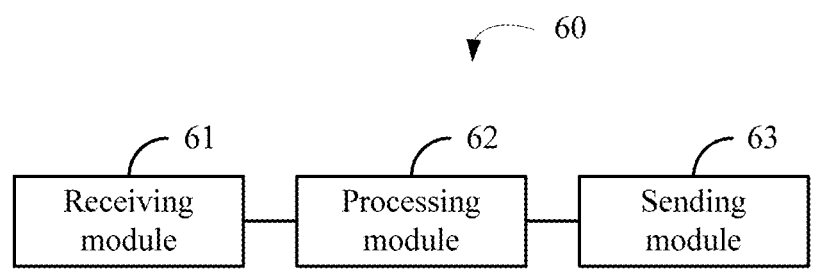
FIG. 6 is a schematic structural diagram in Embodiment 1 of an apparatus for managing an IMSI status of a terminal device according to this application.

FIG. 6 is a schematic structural diagram in Embodiment 1 of an apparatus for managing an IMSI status of a terminal device according to this application. This embodiment of this application provides an apparatus for managing an IMSI status of a terminal device, and the apparatus may be integrated into a core network node. The core network node may be, for example, an MME or an SGSN. As shown in FIG. 6, the apparatus 60 for managing an IMSI status of a terminal device includes a receiving module 61, a processing module 62, and a sending module 63.

The receiving module 61 is configured to receive a first activation request message sent by a first terminal device, where the first activation request message carries an IMSI of a second terminal device and an IMSI status indication of the second terminal device, the first activation request message is used to request the core network node to set the IMSI of the second terminal device to an activated state or a deactivated state, and the IMSI status indication is used to indicate that an IMSI status is the activated state or the deactivated state.

The processing module 62 is configured to: set, based on subscription information of the second terminal device, the IMSI of the second terminal device received by the receiving module 61 to the activated state or the deactivated state, and update the IMSI status indication of the second terminal device.

The sending module 63 is configured to send an activation response message to the first terminal device, where the activation response message carries the IMSI of the second terminal device and an updated IMSI status indication of the second terminal device obtained by the processing module 62.

The apparatus in this embodiment may be configured to execute the technical solution executed by the core network node in the foregoing method embodiment, an implementation principle and a technical effect of the apparatus are similar to those of the method embodiment, and details are not described herein again.

In an implementation, the processing module 62 may be specifically configured to: determine that the IMSI of the second terminal device and an IMSI/IMSIs of one or more terminal devices other than the second terminal device are mapped to a same user identifier, where the user identifier is an MSISDN or a SIP identifier; obtain an IMSI status indication/IMSI status indications of the one or more terminal devices that are mapped to the same user identifier to which the IMSI of the second terminal device is mapped; and set the IMSI of the second terminal device to the activated state or the deactivated state based on the subscription information of the second terminal device and the IMSI status indication of the terminal device mapped to the same user identifier to which the IMSI of the second terminal device is mapped.

Optionally, the first activation request message received by the receiving module 61 may further include a service type corresponding to the IMSI of the second terminal device, and the service type may include at least one of a short message service, voice, and data.

Optionally, the first activation request message received by the receiving module 61 may further include priority information corresponding to an IMSI of the first terminal device and/or priority information corresponding to the IMSI of the second terminal device.

On a basis of the foregoing, the activation response message sent by the sending module 63 may further include an updated service type corresponding to the IMSI of the second terminal device and/or updated priority information corresponding to the IMSI of the second terminal device.

Further, the activation response message sent by the sending module 63 may further include the IMSI of the first terminal device and an updated IMSI status indication of the first terminal device, and/or an updated service type corresponding to the IMSI of the first terminal device, and/or updated priority information corresponding to the IMSI of the first terminal device.

Still further, the first activation request message received by the receiving module 61 may further include the IMSI of the first terminal device and an IMSI status indication of the first terminal device.

Optionally, the processing module 62 may be further configured to: if the IMSI status indication of the second terminal device in the first activation request message received by the receiving module 61 indicates the deactivated state, determine that the IMSI of the second terminal device and an IMSI/IMSIs of one or more terminal devices are mapped to a same user identifier, where the user identifier is an MSISDN or a SIP identifier; and when it is determined that IMSI statuses of the terminal devices mapped to the user identifier are all set to the deactivated state, determine, based on the subscription information of the second terminal device, to set the IMSI of the second terminal device to the activated state; or if the IMSI status indication of the second terminal device in the first activation request message received by the receiving module 61 indicates the deactivated state, determine that the IMSI of the second terminal device and an IMSI/IMSIs of one or more terminal devices are mapped to a same user identifier, where the user identifier is an MSISDN or a SIP identifier; and when it is determined that IMSI statuses of the terminal devices mapped to the user identifier are all set to the deactivated state, determine, based on subscription information of the one or more terminal devices, to set an IMSI of any of the one or more terminal devices to the activated state.

Alternatively, the processing module 62 may be further configured to: if the IMSI status indication of the first terminal device and/or the IMSI status indication of the second terminal device in the first activation request message received by the receiving module 61 indicate/indicates the deactivated state, determine that the IMSI of the first terminal device and/or the IMSI of the second terminal device and an IMSI/IMSIs of one or more terminal devices are mapped to a same user identifier, where the user identifier is an MSISDN or a SIP identifier; and when it is determined that IMSI statuses of the terminal devices mapped to the user identifier are all set to the deactivated state, determine, based on subscription information of the first terminal device and the subscription information of the second terminal device, to set the IMSI of the first terminal device to the activated state or to set the IMSI of the second terminal device to the activated state; or if the IMSI status indication of the first terminal device and/or the IMSI status indication of the second terminal device in the first activation request message received by the receiving module 61 indicate/indicates the deactivated state, determine that the IMSI of the first terminal device and/or the IMSI of the second terminal device and an IMSI/IMSIs of one or more terminal devices are mapped to a same user identifier, where the user identifier is an MSISDN or a SIP identifier; and when it is determined that IMSI statuses of the terminal devices mapped to the user identifier are all set to the deactivated state, determine, based on subscription information of the one or more terminal devices, to set an IMSI of any of the one or more terminal devices to the activated state.

If the processing module 62 determines to set the IMSI of any of the one or more terminal devices to the activated state, the first activation response message received by the receiving module 61 may further include the IMSI of the terminal device that is set to the activated state and that is of the one or more terminal devices and an IMSI status indication of the terminal device that is set to the activated state and that is of the one or more terminal devices.

Optionally, the sending module 63 may be further configured to send a second activation request message to the terminal device that is set to the activated state, where the second activation request message carries the IMSI of the terminal device that is set to the activated state, the IMSI status indication of the terminal device that is set to the activated state, and an updated service type corresponding to the IMSI of the terminal device that is set to the activated state.

Figure 7:
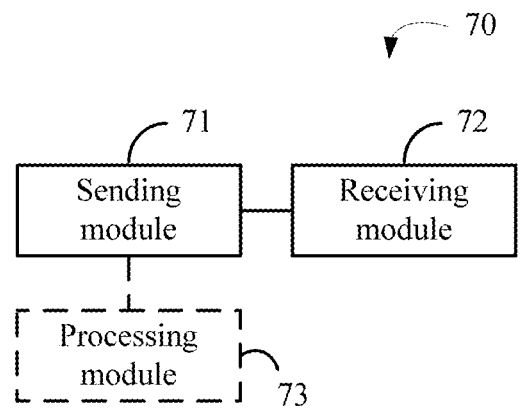
FIG. 7 is a schematic structural diagram in Embodiment 2 of an apparatus for managing an IMSI status of a terminal device according to this application.

FIG. 7 is a schematic structural diagram in Embodiment 2 of an apparatus for managing an IMSI status of a terminal device according to this application. This embodiment of this application provides an apparatus for managing an IMSI status of a terminal device, and the apparatus may be integrated into a first terminal device. As shown in FIG. 7, the apparatus 70 for managing an IMSI status of a terminal device includes a sending module 71 and a receiving module 72.

The sending module 71 is configured to send a first activation request message to a core network node, where the first activation request message carries an IMSI of a second terminal device and an IMSI status indication of the second terminal device, the first activation request message is used to request the core network node to set the IMSI of the second terminal device to an activated state or a deactivated state, and the IMSI status indication is used to indicate that an IMSI status is the activated state or the deactivated state.

The receiving module 72 is configured to receive an activation response message sent by the core network node, where the activation response message carries the IMSI of the second terminal device and an updated IMSI status indication of the second terminal device, and the updated IMSI status indication of the second terminal device is an IMSI status indication of the second terminal device that is updated after the core network node sets, based on subscription information of the second terminal device, the IMSI of the second terminal device to the activated state or the deactivated state.

The apparatus in this embodiment may be configured to execute the technical solution executed by the first terminal device in the foregoing method embodiment, an implementation principle and a technical effect of the apparatus are similar to those of the method embodiment, and details are not described herein again.

On a basis of the foregoing, the receiving module 72 may be further configured to: before the sending module 71 sends the first activation request message to the core network node, receive a third activation request message sent by the second terminal device, where the third activation request message carries the IMSI of the second terminal device and the IMSI status indication of the second terminal device. Correspondingly, the sending module 71 may be further configured to: after the receiving module 72 receives the activation response message sent by the core network node, send the activation response message to the second terminal device.

Optionally, the third activation request message received by the receiving module 72 may further include a service type corresponding to the IMSI of the second terminal device, and the service type includes at least one of a short message service, voice, and data.

Optionally, the first activation request message sent by the sending module 71 is generated based on the third activation request message received by the receiving module 72.

Optionally, the first activation request message sent by the sending module 71 may further include an IMSI of the first terminal device and an IMSI status indication of the first terminal device. Correspondingly, the activation response message received by the receiving module 72 may further include the IMSI of the first terminal device and the IMSI status indication of the first terminal device.

Optionally, the first activation request message sent by the sending module 71 may further include a service type corresponding to the IMSI of the first terminal device, and the service type includes at least one of a short message service, voice, and data.

Optionally, the first activation request message sent by the sending module 71 may further include priority information corresponding to the IMSI of the first terminal device and/or priority information corresponding to the IMSI of the second terminal device.

Optionally, the activation response message received by the receiving module 72 may further include at least one of an updated service type corresponding to the IMSI of the second terminal device, updated priority information corresponding to the IMSI of the second terminal device, an updated service type corresponding to the IMSI of the first terminal device, and updated priority information corresponding to the IMSI of the first terminal device.

Based on the foregoing embodiment, the apparatus 70 for managing an IMSI status of a terminal device may further include a processing module 73.

The processing module 73 is configured to: before the sending module 71 sends the first activation request message to the core network node, establish a communications link with the second terminal device, so that the second terminal device is connected to a network by using the first terminal device.

Optionally, the processing module 73 may be further configured to generate the first activation request message based on status change information of the first terminal device, where the status change information may include a battery level change and/or a radio link change, and the like.

Further, the receiving module 72 may be further configured to: before the sending module 71 sends the first activation request message to the core network node, receive an operation instruction that is entered by a user and that is used to instruct to send the first activation request message.

In an implementation, the processing module 73 may be further configured to: when the IMSI status indication of the first terminal device in the first activation request message sent by the sending module 71 indicates the deactivated state, and the IMSI status indication of the second terminal device in the first activation request message sent by the sending module 71 indicates the activated state, before the sending module 71 sends the first activation request message to the core network node, determine to deactivate the IMSI of the first terminal device; and select the second terminal device as a to-be-activated terminal device based on a pre-stored IMSI status indication of a terminal device that is mapped to a same user identifier to which the IMSI of the first terminal device is mapped, where the user identifier is an MSISDN or a SIP identifier.

In another implementation, when the IMSI status indication of the second terminal device in the first activation request message sent by the sending module 71 indicates the deactivated state, and the IMSI status indication of the first terminal device in the first activation request message sent by the sending module 71 indicates the activated state, the first terminal device is a to-be-activated terminal device that is selected by the second terminal device, after determining to deactivate the IMSI of the second terminal device, based on a pre-stored IMSI status indication of a terminal device that is mapped to a same user identifier to which the IMSI of the second terminal device is mapped, where the user identifier is an MSISDN or a SIP identifier.

Figure 8:
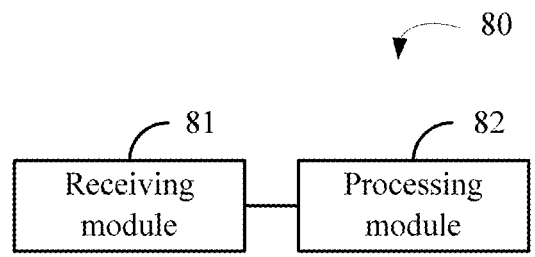
FIG. 8 is a schematic structural diagram in Embodiment 3 of an apparatus for managing an IMSI status of a terminal device according to this application.

FIG. 8 is a schematic structural diagram in Embodiment 3 of an apparatus for managing an IMSI status of a terminal device according to this application. This embodiment of this application provides an apparatus for managing an IMSI status of a terminal device, and the apparatus may be integrated into the terminal device. As shown in FIG. 8, the apparatus 80 for managing an IMSI status of a terminal device includes a receiving module 81 and a processing module 82.

The receiving module 81 is configured to receive a second activation request message sent by a core network node, where the second activation request message carries an IMSI of the terminal device and an IMSI status indication of the terminal device, the second activation request message is used to request the terminal device to set the IMSI of the terminal device to an activated state or a deactivated state, the terminal device is a terminal device that is set to the activated state and that is determined by the core network node based on an IMSI status indication carried in a first activation request message sent by a first terminal device, and the IMSI status indication is used to indicate that an IMSI status is the activated state or the deactivated state.

The processing module 82 is configured to set the IMSI of the terminal device to the activated state or the deactivated state based on the IMSI status indication of the terminal device in the second activation request message received by the receiving module 81.

The apparatus in this embodiment may be configured to execute the technical solution executed by the terminal device that is set to the activated state in the foregoing method embodiment, an implementation principle and a technical effect of the apparatus are similar to those of the method embodiment, and details are not described herein again.

Optionally, the second activation request message received by the receiving module 81 may further include a service type corresponding to the IMSI of the terminal device, and the service type includes at least one of a short message service, voice, and data.

It should be noted that, in any embodiment of this application, functions of the processing module may be specifically implemented by a processor in a corresponding terminal device or core network node, functions of the sending module may be specifically implemented by a transmitter in a corresponding terminal device or core network node, and functions of the receiving module may be specifically implemented by a receiver in a corresponding terminal device or core network node. For details, refer to the foregoing apparatus embodiments. The transmitter and the receiver may be separately and independently disposed, or may be integrated into a transceiver. This is not limited in this embodiment of this application.

Figure 9:
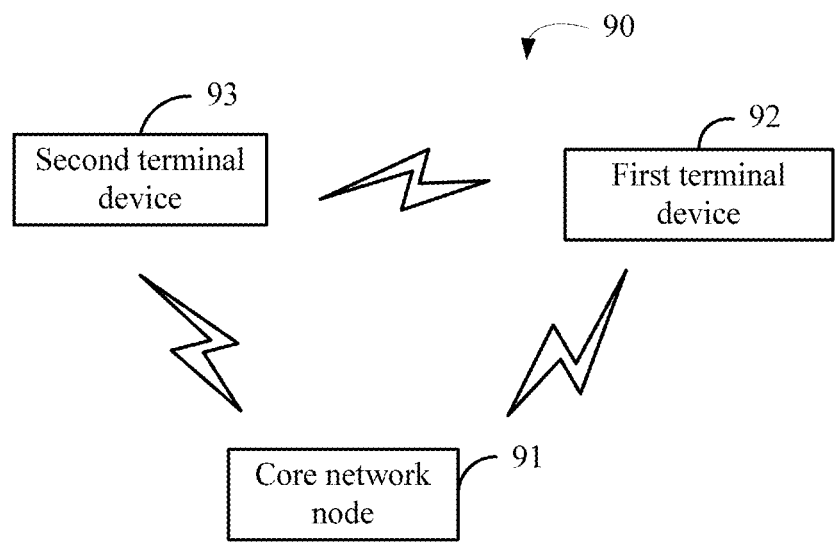
FIG. 9 is a schematic structural diagram in Embodiment 1 of a system for managing an IMSI status of a terminal device according to this application.

FIG. 9 is a schematic structural diagram in Embodiment 1 of a system for managing an IMSI status of a terminal device according to this application. As shown in FIG. 9, the system 90 for managing an IMSI status of a terminal device includes a core network node 91, a first terminal device 92, and a second terminal device 93.

The core network node 91 includes the apparatus shown in FIG. 6, the first terminal device includes the apparatus shown in FIG. 7, and both the first terminal device 92 and the second terminal device 93 include the apparatus shown in FIG. 8.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on an actual requirement, to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of hardware in addition to a software function unit.

When the foregoing integrated unit is implemented in a form of a software function unit, the integrated unit may be stored in a computer-readable storage medium. The software function unit is stored in a storage medium and includes one or more instructions for instructing a computer device (which may be a personal computer, a server, a network device, or the like) or a processor (processor) to perform some of the steps of the methods described in the embodiments of this application. The foregoing storage medium includes various media that can store program code, such as a USB flash drive, a removable hard disk, a ROM, a RAM, a magnetic disk, or an optical disc.

Finally, it should be noted that the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions in the embodiments of this application.

What is claimed is:

1. A method for managing an international mobile subscriber identity (IMSI) status of a terminal device, comprising:

receiving, by a core network node, a first activation request message sent by a first terminal device, wherein the first activation request message carries an IMSI of a second terminal device and an IMSI status indication of the second terminal device, wherein the first activation request message requests the core network node to set the IMSI of the second terminal device to an activated state or a deactivated state, and wherein the IMSI status indication indicates that an IMSI status is the activated state or the deactivated state;

setting, by the core network node based on subscription information of the second terminal device, the IMSI of the second terminal device to the activated state when the IMSI status is in the activated state or the deactivated state when the IMSI status is in the deactivated state, and updating the IMSI status indication of the second terminal device; and sending, by the core network node, an activation response message to the first terminal device, wherein the activation response message carries the IMSI of the second terminal device and an updated IMSI status indication of the second terminal device.

2. The method according to claim 1, wherein the setting, by the core network node based on subscription information of the second terminal device, the IMSI of the second terminal device to the activated state when the IMSI status is in the activated state or the deactivated state when the IMSI status is in the deactivated state comprises:

determining, by the core network node, that the IMSI of the second terminal device and one or more IMSIs of one or more terminal devices other than the second terminal device are mapped to a same user identifier, wherein the user identifier is a mobile subscriber international integrated services digital network (ISDN)/public switched telephone network (PSTN) number mobile station international ISDN number (MSISDN) or a Session Initiation Protocol (SIP) identifier;

obtaining, by the core network node, one or more IMSIs status indications of the one or more terminal devices that are mapped to the same user identifier to which the IMSI of the second terminal device is mapped; and setting, by the core network node, the IMSI of the second terminal device to the activated state when the IMSI status is in the activated state or the deactivated state when the IMSI status is in the deactivated state based on the subscription information of the second terminal device and the IMSI status indication of the terminal device mapped to the same user identifier to which the IMSI of the second terminal device is mapped.

3. The method according to claim 1, wherein the first activation request message further comprises a service type corresponding to the IMSI of the second terminal device, and the service type comprises at least one of a short message, voice, or data.

4. The method according to claim 1, wherein the first activation request message further comprises priority information corresponding to an IMSI of the first terminal device and/or priority information corresponding to the IMSI of the second terminal device.

5. The method according to claim 1, wherein the activation response message further comprises an updated service type corresponding to the IMSI of the second terminal device and/or updated priority information corresponding to the IMSI of the second terminal device.

6. A method for managing an international mobile subscriber identity (IMSI) status of a terminal device, comprising:

sending, by a first terminal device, a first activation request message to a core network node, wherein the first activation request message carries an IMSI of a second terminal device and an IMSI status indication of the second terminal device, wherein the first activation request message requests the core network node to set the IMSI of the second terminal device to an activated state or a deactivated state, and wherein the IMSI status indication indicates that an IMSI status is the activated state or the deactivated state; and receiving, by the first terminal device, an activation response message sent by the core network node, wherein the activation response message carries the IMSI of the second terminal device and an updated IMSI status indication of the second terminal device, and the updated IMSI status indication of the second terminal device is an IMSI status indication of the second terminal device that is updated after the core network node sets, based on subscription information of the second terminal device, the IMSI of the second terminal device to the activated state when the IMSI status is in the activated state or the deactivated state when the IMSI status is in the deactivated state.

7. The method according to claim 6, wherein before the sending, by a first terminal device, a first activation request message to a core network node, the method further comprises:

receiving, by the first terminal device, a third activation request message sent by the second terminal device, wherein the third activation request message carries the IMSI of the second terminal device and the IMSI status indication of the second terminal device; and after the receiving, by the first terminal device, an activation response message sent by the core network node, the method further comprises:
sending, by the first terminal device, the activation response message to the second terminal device.

8. The method according to claim 6, wherein the third activation request message further comprises a service type corresponding to the IMSI of the second terminal device, and the service type comprises at least one of a short message, voice, and data.

9. The method according to claim 6, wherein the first activation request message is generated based on the third activation request message.

10. The method according to claim 6, wherein the first activation request message further comprises an IMSI of the first terminal device and an IMSI status indication of the first terminal device; and
wherein the activation response message further comprises the IMSI of the first terminal device and an updated IMSI status indication of the first terminal device.

11. An apparatus comprising a core network node for managing an international mobile subscriber identity (IMSI) status of a terminal device, the apparatus comprising:
a receiver, configured to receive a first activation request message sent by a first terminal device, wherein the first activation request message carries an IMSI of a second terminal device and an IMSI status indication of the second terminal device, wherein the first activation request message requests the core network node to set the IMSI of the second terminal device to an activated state or a deactivated state, and wherein the IMSI status indication is used to indicate that an IMSI status is the activated state or the deactivated state;
a processor, configured to: set, based on subscription information of the second terminal device, the IMSI of the second terminal device received by the receiver to the activated state when the IMSI status is in the activated state or the deactivated state when the IMSI status is in the deactivated state, and update the IMSI status indication of the second terminal device; and
a transmitter, configured to send an activation response message to the first terminal device, wherein the activation response message carries the IMSI of the second terminal device and updated IMSI status indication of the second terminal device obtained by the processor.

12. The apparatus according to claim 11, wherein the processor is further configured to:
determine that the IMSI of the second terminal device and one or more IMSIs of one or more terminal devices other than the second terminal device are mapped to a same user identifier, wherein the user identifier is a mobile subscriber international integrated services digital network (ISDN)/public switched telephone network (PSTN) number mobile station international ISDN number (MSISDN) or a Session Initiation Protocol (SIP) identifier;
obtain one or more IMSIs status indications of the one or more terminal devices that are mapped to the same user identifier to which the IMSI of the second terminal device is mapped; and
set the IMSI of the second terminal device to the activated state when the IMSI status is in the activated state or the deactivated state when the IMSI status is in the deactivated state based on the subscription information of the second terminal device and the IMSI status indication of the terminal device mapped to the same user identifier to which the IMSI of the second terminal device is mapped.

13. The apparatus according to claim 11, wherein the first activation request message received by the receiver further comprises a service type corresponding to the IMSI of the second terminal device, and the service type comprises at least one of a short message, voice, and data.

14. The apparatus according to claim 11, wherein the first activation request message received by the receiver further comprises priority information corresponding to an IMSI of the first terminal device and/or priority information corresponding to the IMSI of the second terminal device.

15. The apparatus according to claim 11, wherein the activation response message sent by the transmitter further comprises an updated service type corresponding to the IMSI of the second terminal device and/or updated priority information corresponding to the IMSI of the second terminal device.

16. An apparatus comprising a first terminal device for managing an international mobile subscriber identity (IMSI) status of a terminal device, the apparatus comprising:
a transmitter, configured to send a first activation request message to a core network node, wherein the first activation request message carries an IMSI of a second terminal device and an IMSI status indication of the second terminal device, wherein the first activation request message requests the core network node to set the IMSI of the second terminal device to an activated state or a deactivated state, and wherein the IMSI status indication indicates that an IMSI status is the activated state or the deactivated state; and
a receiver, configured to receive an activation response message sent by the core network node, wherein the activation response message carries the IMSI of the second terminal device and an updated IMSI status indication of the second terminal device, and the updated IMSI status indication of the second terminal device is an IMSI status indication of the second terminal device that is updated after the core network node sets, based on subscription information of the second terminal device, the IMSI of the second terminal device to the activated state when the IMSI status is in the activated state or the deactivated state when the IMSI status is in the deactivated state.

17. The apparatus according to claim 16, wherein the receiver is further configured to:
before the transmitter sends the first activation request message to the core network node, receive a third activation request message sent by the second terminal device, wherein the third activation request message carries the IMSI of the second terminal device and the IMSI status indication of the second terminal device; and
the transmitter is further configured to: after the receiver receives the activation response message sent by the core network node, send the activation response message to the second terminal device.

18. The apparatus according to claim 16, wherein the third activation request message received by the receiver further comprises a service type corresponding to the IMSI of the second terminal device, and the service type comprises at least one of a short message, voice, and data.

19. The apparatus according to claim 16, wherein the first activation request message sent by the transmitter is generated based on the third activation request message received by the receiver.

20. The apparatus according to claim 16, wherein the first activation request message sent by the transmitter further comprises an IMSI of the first terminal device and an IMSI status indication of the first terminal device; and the activation response message received by the receiver further comprises the IMSI of the first terminal device and the IMSI status indication of the first terminal device.

* * * * *